US010119058B2

(12) United States Patent
Yang et al.

(10) Patent No.: US 10,119,058 B2
(45) Date of Patent: *Nov. 6, 2018

(54) HEAT TRANSFER FLUID ADDITIVE COMPOSITION

(71) Applicant: PRESTONE PRODUCTS CORPORATION, Danbury, CT (US)

(72) Inventors: Bo Yang, Ridgefield, CT (US); Aleksei Gershun, Southbury, CT (US); Peter M. Woyciesjes, Woodbury, CT (US)

(73) Assignee: Prestone Products Corporation, Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/443,630

(22) Filed: Feb. 27, 2017

(65) Prior Publication Data
US 2017/0174969 A1    Jun. 22, 2017

Related U.S. Application Data

(63) Continuation of application No. 14/639,637, filed on Mar. 5, 2015, now Pat. No. 9,598,624, which is a continuation of application No. 13/606,527, filed on Sep. 7, 2012, now Pat. No. 9,023,235.

(51) Int. Cl.
C09K 5/10    (2006.01)

(52) U.S. Cl.
CPC .......... *C09K 5/10* (2013.01); *C09K 2205/102* (2013.01); *C09K 2205/132* (2013.01)

(58) Field of Classification Search
None
See application file for complete search history.

(56) References Cited

U.S. PATENT DOCUMENTS

| | | |
|---|---|---|
| 3,198,820 A | 8/1965 | Pines et al. |
| 3,203,969 A | 8/1965 | Pines et al. |
| 3,248,329 A | 4/1966 | Pines et al. |
| 3,312,622 A | 4/1967 | Pines et al. |
| 3,337,496 A | 8/1967 | Pines et al. |
| 3,341,469 A | 9/1967 | Pines et al. |
| 3,931,029 A | 1/1976 | Dutton et al. |
| 3,981,682 A | 9/1976 | Ward et al. |
| 4,093,641 A | 6/1978 | Plueddemann |
| 4,287,077 A | 9/1981 | Wing |
| 4,333,843 A | 6/1982 | Wing et al. |
| 4,352,742 A | 10/1982 | Davis et al. |
| 4,354,002 A | 10/1982 | Davis et al. |
| 4,362,644 A | 12/1982 | Davis et al. |
| 4,370,255 A | 1/1983 | Plueddemann |
| 4,392,972 A | 7/1983 | Mohr et al. |
| 4,404,114 A | 9/1983 | Mohr et al. |
| 4,517,110 A | 5/1985 | Suzuki et al. |
| 4,556,106 A | 12/1985 | Evans |
| 4,614,600 A | 9/1986 | Schilling et al. |
| 4,629,602 A | 12/1986 | Gousetis et al. |
| 4,701,277 A | 10/1987 | Mohr et al. |
| 4,772,408 A | 9/1988 | Mohr et al. |
| 5,018,577 A | 5/1991 | Pardue et al. |
| 5,242,621 A | 9/1993 | Miller et al. |
| 5,292,480 A | 3/1994 | Fischer et al. |
| 5,338,477 A | 8/1994 | Chen et al. |
| 5,606,105 A | 2/1997 | Davis et al. |
| 5,704,961 A | 1/1998 | Hudson |
| 5,741,436 A | 4/1998 | Gershun et al. |
| 5,866,042 A | 2/1999 | Chen et al. |
| 5,925,173 A | 7/1999 | Frost et al. |
| 6,080,331 A | 6/2000 | Meszaros et al. |
| 6,126,852 A * | 10/2000 | Turcotte .................. C23F 11/08 252/76 |
| 6,235,217 B1 | 5/2001 | Turcotte et al. |
| 6,391,257 B1 | 5/2002 | Woyciesjes |
| 6,572,789 B1 | 6/2003 | Yang et al. |
| 6,733,687 B1 | 5/2004 | Hudgens |
| 7,608,198 B2 | 10/2009 | Jeffcoate |
| 7,645,331 B2 | 1/2010 | Yang |
| 7,662,304 B2 | 2/2010 | Woyciesjes |
| 7,820,066 B2 | 10/2010 | Jeffcoate |
| 7,854,253 B2 | 12/2010 | Woyciesjes |
| 7,985,349 B2 | 7/2011 | Yang |

(Continued)

FOREIGN PATENT DOCUMENTS

| | | |
|---|---|---|
| CN | 1982406 | 6/2007 |
| CN | 101134891 | 3/2008 |

(Continued)

OTHER PUBLICATIONS

International Search Report and Written Opinion of PCT/US2013/56267 dated Sep. 13, 2013.
International Search Report and Written Opinion of PCT/US2013/56262 dated Oct. 16, 2013.
International Search Report and Written Opinion of PCT/US2013/56268 dated Sep. 19, 2013.
International Search Report and Written Opinion of PCT/2006/024741 dated Oct. 31, 2006.
IUPAC Gold Book "acid anhydrides", source: PAC, 1995, 67, 1307 p. 1311.
EIC STIC U.S. Appl. No. 11/474,726; 11474726-280021—ELCsearch.pdf.

(Continued)

Primary Examiner — Necholus Ogden, Jr.
(74) Attorney, Agent, or Firm — Gregory H. Zayia; Barnes & Thornburg LLP

(57) ABSTRACT

Disclosed herein is a heat transfer fluid additive composition comprising: greater than or equal to 10 weight percent (wt %) of a carboxylic acid, based on the total weight of the composition; an azole compound; and a base, wherein the base is present in an amount sufficient to obtain a pH 8-10.5 when diluted by 50 volume % with water. The heat transfer fluid additive composition can be combined with other components to form a heat transfer fluid. The heat transfer fluid can be used in a heat transfer system.

38 Claims, No Drawings

(56) References Cited

U.S. PATENT DOCUMENTS

| | | | |
|---|---|---|---|
| 8,216,383 | B2 | 7/2012 | Yang |
| 2002/0076591 | A1 | 6/2002 | Imaseki et al. |
| 2004/0227124 | A1 | 11/2004 | Turcotte et al. |
| 2006/0010872 | A1 | 1/2006 | Singh et al. |
| 2006/0017044 | A1 | 1/2006 | Zhang et al. |
| 2007/0034825 | A1 | 2/2007 | Wenderoth et al. |
| 2007/0034826 | A1 | 2/2007 | Woyciesjes |
| 2009/0266519 | A1 | 10/2009 | Marinho |
| 2009/0294102 | A1 | 12/2009 | Yang |
| 2010/0006796 | A1 | 1/2010 | Yang |
| 2010/0059703 | A1 | 3/2010 | Yang et al. |
| 2010/0116473 | A1 | 5/2010 | Yang et al. |

FOREIGN PATENT DOCUMENTS

| | | | |
|---|---|---|---|
| CN | 101691484 | | 4/2010 |
| EP | 0245557 | | 11/1987 |
| EP | 0381656 | | 8/1990 |
| EP | 0936024 | | 8/1999 |
| EP | 1262535 | | 12/2002 |
| EP | 1416563 | | 5/2004 |
| EP | 2374859 | | 10/2011 |
| GB | 2049650 | * | 12/1980 |
| JP | S56-000283 | | 1/1981 |
| JP | 1212779 | | 8/1989 |
| JP | 6234817 | | 8/1994 |
| JP | 7310162 | | 11/1995 |
| JP | 200116778 | | 6/2001 |
| JP | 2001164224 | | 6/2001 |
| JP | 2002-069676 | | 3/2002 |
| JP | 2004233011 | | 8/2004 |
| JP | 2012-508297 | | 4/2012 |
| KR | 19900000152 | | 1/1990 |
| WO | WO 00/11102 | | 2/2000 |
| WO | WO 2006/029327 | | 3/2006 |

OTHER PUBLICATIONS

International Search Report and Written Opinion of PCT/US13/56260 dated Jan. 24, 2014.
Japanese Patent No. 01212779; Publication Date: Aug. 25, 1989; Abstract Only; 1 Page.
Japanese Patent No. 02021572; Publication Date: Jan. 24, 1990; Abstract only; 1 page.
Japanese Patent No. 06234817; Publication Date: Jan. 24, 1990; Abstract only; 1 page.
Japanese Patent No. 07310162; Publication Date: Jan. 24, 1990; Abstract only; 1 page.
Japanese Patent No. 02001164244; Publication Date: Jan. 24, 1990; Abstract only; 1 page.
Japanese Patent No. 2001-167778; Publication Date: Jan. 24, 1990; Abstract only; 1 page.
Japanese Patent No. 2004233011; Publication Date: Jan. 24, 1990; Abstract only; 1 page.
Japanese Patent No. 5001940; Publication Date: Jan. 24, 1990; Abstract only; 1 page.
Non-final Office Action dated Mar. 15, 2013 in U.S. Appl. No. 13/606,516.
Non-final Office Action dated Mar. 15, 2013 in U.S. Appl. No. 13/606,452.
Non-Final Office Action dated Mar. 20, 2014, U.S. Appl. No. 13/606,527.
Search Report issued in App. No. EP13835996.3 (dated Mar. 21, 2016).
U.S. Appl. No. 13/606,527, filed Sep. 7, 2012.
U.S. Appl. No. 14/639,637, filed Mar. 5, 2015.
Office Action issued in App. No. CN201380046727.7 (dated Jan. 12, 2017).
Office Action issued in App. No. CN201380046727.7 (dated Mar. 15, 2018).
Examination Report issued in App. No. EP13835996.3 (dated Feb. 20, 2018).
Office Action issued in App. No. JP2015531107 (dated Feb. 2, 2018).
Examination Report Issued in Indian Application No. 1805/DELNP/2015 dated Aug. 16, 2018.

* cited by examiner

HEAT TRANSFER FLUID ADDITIVE COMPOSITION

CROSS REFERENCE TO RELATED APPLICATIONS

This application is a continuation of U.S. patent application Ser. No. 14/639,637, filed Mar. 5, 2015, which is a continuation of U.S. patent application Ser. No. 13/606,527, filed Sep. 7, 2012 (now U.S. Pat. No. 9,023,235), the entire contents of both of which are hereby incorporated herein by reference.

BACKGROUND

Modern vehicle engines generally require a heat transfer fluid (liquid coolant) to provide long-lasting, year-round protection of their cooling systems. The primary requirements of heat transfer fluids are that they provide efficient heat transfer to control and maintain engine temperature for efficient fuel economy and lubrication, and prevent engine failures due to freeze-up, boiling-over, or over-heating. There are a variety of types of heat transfer fluids which comprise a significant quantity of solvent or solvents. As the cost of transportation and packaging rises, the advantages of creating a heat transfer fluid closer to the point of use become clear. Difficulties arise however in the wide range of formulations for heat transfer fluids and the stability issues associated with additive composition solutions.

There is an ongoing need for a heat transfer fluid additive composition having good storage stability and wide ranging utility.

BRIEF DESCRIPTION

This need is met, at least in part, by a heat transfer fluid additive composition comprising greater than or equal to 10 weight percent (wt %) of a carboxylate, based on the total weight of the composition; an azole compound; a base; and water, wherein the base is present in an amount sufficient to obtain a pH of 7 to 10.5 when the heat transfer additive composition is diluted by 50 volume % with water. The heat transfer fluid additive composition can be combined with other components to form a heat transfer fluid. The heat transfer fluid additive composition can be combined with an existing heat transfer fluid to modify the heat transfer fluid. The heat transfer fluid can be used in a heat transfer system with or without other components or existing heat transfer fluid.

DETAILED DESCRIPTION

Disclosed herein are heat transfer fluid additive compositions that facilitate the preparation of heat transfer fluids having a wide range of formulations. The additive composition can also be employed to modify the composition of an existing heat transfer fluid to provide improved performance.

The heat transfer fluid additive composition can be free of silicate, borate and amines. The nitrate content can be less than 100 parts per million by weight (ppm), or, more specifically, less than 50 ppm by weight based on the total weight of the heat transfer fluid. The additive composition can also be free of glycols, glycerols, glycerin, and/or other solvents/freeze point depressants, or a combination thereof.

The carboxylate has 6 to 20 carbon atoms. The term "carboxylate" is inclusive of carboxylic acid, salt thereof, and combinations of a carboxylic acid and carboxylic acid salt. The carboxylate may comprise a single or multiple carboxyl groups and may be linear or branched. It is expressly contemplated that combinations of carboxylates may be used and are encompassed by the term "carboxylate" or "carboxylic acid". Exemplary aliphatic carboxylates include 2-ethyl hexanoic acid, hexanoic acid, heptanoic acid, octanoic acid, neodecanoic acid, decanoic acid, nonanoic acid, isoheptanoic acid, dodecanoic acid, sebacic acid, adipic acid, pimelic acid, suberic acid, azelaic acid, dodecanedioic acid, and combinations of two or more of the foregoing. Exemplary aromatic carboxylates include benzoic acid, toluic acid or methylbenzoic acid, tert-butyl benzoic acid, alkoxy benzoic acid, e.g., methoxybenzoic acid (or o, p, m-anisic acid), salicylic acid, phthalic acid, isophthalic acid, terephthalic acid, phenylacetic acid, mandelic acid, 1,2,4-benzenetricarboxylic acid, and combinations of two or more of the foregoing.

In the heat transfer fluid, additive composition the carboxylate is present in an amount greater than or equal to 10 wt %, based on the total weight of the heat transfer fluid additive composition. Within this range, the amount can be greater than or equal to about 15 wt %, or, more specifically, greater than or equal to about 20 wt %. The amount can be less than or equal to about 90 wt %, or, more specifically, less than or equal to about 80 wt %.

The heat transfer fluid additive composition comprises an azole. Exemplary azoles include benzotriazole, tolyltriazole, methyl benzotriazole (e.g., 4-methyl benzotriazole and 5-methyl benzotriazole), butyl benzotriazole, and other alkyl benzotriazoles (e.g., the alkyl group contains from 2 to 20 carbon atoms), mercaptobenzothiazole, thiazole and other substituted thiazoles, imidazole, benzimidazole, and other substituted imidazoles, indazole and substituted indazoles, tetrazole, tetrahydrotolyltriazole, and substituted tetrazoles. Combinations of two or more of the foregoing azoles may also be used and combinations of azoles are included in the term "azole".

In the heat transfer fluid additive composition, the azole compound can be present in an amount of about 0.01 wt % to about 10 wt %, based on the total weight of the heat transfer fluid additive composition. Within this range, the azole compound can be present in an amount greater than or equal to about 0.3 wt %, or, more specifically, greater than or equal to about 0.5 wt %. Also within this range, the azole compound can be present in an amount less than or equal to about 9 wt %, or, more specifically, less than or equal to about 8 wt %.

Exemplary bases include sodium hydroxide, potassium hydroxide, and the like. The base is present in an amount sufficient to obtain a pH of about 7 to about 10.5 when the heat transfer fluid additive composition is diluted by 50 volume % with water. Within this pH range, the pH can be greater than or equal to about 7.5, or, more specifically, greater than or equal to about 8.

In the heat transfer fluid additive composition, water can be present in an amount of about 10 wt % to 90 wt %, based on the total weight of the heat transfer fluid additive composition. Within this range, water can be present in an amount less than or equal to 50 wt %, or, more specifically, less than or equal to 40 wt %, or, more specifically, less than or equal to 25 wt %.

The heat transfer fluid additive composition may further comprise one or more optional components such as a non-aqueous solvent, an inorganic phosphate, lithium ions, magnesium ions, calcium ions, an acrylate based polymer, a phosphonocarboxylate, a phosphinocarboxylate, antifoaming agent or defoamer, dispersant, scale inhibitor, surfactant, colorant and combinations of two or more of the foregoing optional components.

Exemplary non-aqueous solvents include glycols, glycerin, or a combination thereof. Exemplary glycols include ethylene glycol, propylene glycol (including 1,2-propylene glycol and 1,3-propylene glycol), diethylene glycol, triethylene glycol, dipropylene glycol, butylene glycol, and combinations of two or more of the foregoing non-aqueous solvents.

The non-aqueous solvent can be present in an amount of about 10 wt % to about 85 wt %, based on the total weight of the heat transfer fluid additive composition. Within this range, the non-aqueous solvent can be present in an amount less than or equal to about 40 wt %, or, more specifically, less than or equal to about 20 wt %.

Exemplary inorganic phosphates include phosphoric acid, sodium orthophosphate, potassium orthophosphate, sodium pyrophosphate, potassium pyrophosphate, sodium polyphosphate, potassium polyphosphate, sodium hexametaphosphate, potassium hexametaphosphate, and combinations of two or more of the foregoing inorganic phosphates.

The inorganic phosphate can be present in an amount of about 1 wt % to about 10 wt %, based on the total weight of the heat transfer fluid additive composition. Within this range, the amount can be greater than or equal to about 1.5 wt %, or, more specifically, greater than or equal to about 2 wt %. Also within this range, the amount can be less than or equal to about 6 wt %, or, more specifically, less than or equal to about 4 wt %.

The lithium ions are derived from a lithium compound or compounds that can produce lithium ions upon dissolving in a water containing solution at room temperature. The lithium compound can be an inorganic lithium compound such as lithium hydroxide, lithium phosphate, lithium borate, lithium nitrate, lithium perchlorate, lithium sulfate, lithium molybdate, lithium vanadate, lithium tungstate, lithium carbonate, or a combination thereof. The lithium compound is soluble in the heat transfer fluid. Soluble, as used herein, is defined as dissolving such that no particulate matter is visible to the naked eye. The lithium compound can also be lithium salt formed between lithium ions and an organic acid containing one or more carboxylic acid groups, such as lithium acetate, lithium benzoate, lithium polyacrylate, lithium polymaleate, lithium lactate, lithium citrate, lithium tartrate, lithium gluconate, lithium glucoheptonate, lithium glycolate, lithium glucarate, lithium succinate, lithium hydroxyl succinate, lithium adipate, lithium oxalate, lithium malonate, lithium sulfamate, lithium formate, lithium propionate, lithium salt of aliphatic mono-, di- or tri-carboxylic acid or aromatic mono-, di- or tri-carboxylic acid, and combinations of the foregoing lithium compounds.

The magnesium ions are derived from a magnesium compound that can produce magnesium ions upon dissolving in a water containing solution at room temperature. The magnesium compound can be an inorganic magnesium compound such as magnesium nitrate, magnesium sulfate, magnesium molybdate, magnesium tungstate, magnesium vanadate, magnesium perchlorate, magnesium hydroxide or a combination thereof. The magnesium compound is soluble in the heat transfer fluid. Soluble, as used herein, is defined as dissolving such that no particulate matter is visible to the naked eye. The magnesium compound can also be magnesium salt formed between magnesium ions and an organic acid containing one or more carboxylic acid groups, such as magnesium polyacrylate, magnesium polymaleate, magnesium lactate, magnesium citrate, magnesium tartrate, magnesium gluconate, magnesium glucoheptonate, magnesium glycolate, magnesium glucarate, magnesium succinate, magnesium hydroxysuccinate, magnesium adipate, magnesium oxalate, magnesium malonate, magnesium sulfamate, magnesium formate, magnesium acetate, magnesium propionate, magnesium salt of aliphatic tri-carboxylic acid or aliphatic tetra-carboxylic acid, and combinations of the foregoing magnesium compounds.

The calcium ions are derived from a calcium compound that can produce calcium ions upon dissolving in a water containing solution at room temperature. The calcium compound can be an inorganic calcium compound such as calcium nitrate, calcium chloride, calcium perchlorate, calcium molybdate, calcium tungstate, calcium vanadate, calcium hydroxide, or a combination thereof. The calcium compound is soluble in the heat transfer fluid. Soluble, as used herein, is defined as dissolving such that no particulate matter is visible to the naked eye. The calcium compound can also be calcium salt formed between calcium ions and an organic acid containing one or more carboxylic acid groups, such as calcium polyacrylate, calcium polymaleate, calcium lactate, calcium citrate, calcium tartrate, calcium gluconate, calcium glucoheptonate, calcium glycolate, calcium glucarate, calcium succinate, calcium hydroxysuccinate, calcium adipate, calcium oxalate, calcium malonate, calcium sulfamate, calcium formate, calcium acetate, calcium propionate, calcium salts of aliphatic tri-carboxylic acid or aliphatic tetra-carboxylic acid, and combinations of the foregoing calcium compounds.

The acrylate based polymer is a water soluble polymer (average molecular weight of 200 to 200,000 Daltons). Exemplary acrylate polymers include polyacrylates, acrylate based polymers, copolymers, terpolymers, and quadpolymers, such as acrylate/acrylamide copolymers, polymethacrylates, polymaleic acids or maleic anhydride polymers, maleic acid based polymers, their copolymers and terpolymers, modified acrylamide based polymers, including polyacrylamides, acrylamide based copolymers and terpolymers. In general, water soluble polymers suitable for use include homo-polymers, copolymers, terpolymer and inter-polymers having (1) at least one monomeric unit containing $C_3$ to $C_{16}$ monoethylenically unsaturated mono- or dicarboxylic acids or their salts; or (2) at least one monomeric unit containing $C_3$ to $C_{16}$ monoethylenically unsaturated mono- or dicarboxylic acid derivatives such as amides, nitriles, carboxylate esters, acid halides (e.g., chloride), and acid anhydrides, and combination thereof. In some embodiments, the acrylate based polymer comprises a phosphinopolyacrylate.

Phosphonocarboxylates are phosphonated compounds having the general formula

$$H[CHRCHR]_n\text{---}PO_3M_2$$

wherein at least one R group in each unit is a COOM, $CH_2OH$, sulphono or phosphono group and the other R group which may be the same as, or different from, the first R group, is a hydrogen or a COOM, hydroxyl, phosphono, sulphono, sulphato, $C_{1-7}$ alkyl, $C_{1-7}$ alkenyl group or a carboxylate, phosphono, sulphono, sulphato and/or hydroxyl substituted $C_{1-7}$ alkyl or $C_{1-7}$ alkenyl group, n is 1 or an integer greater than 1, and each M is hydrogen or an alkali metal ion such as a sodium ion, potassium ion and the like. Furthermore, at least one COOM group will be present in one of the R groups. Preferably, the phosphonocarboxylates are phosphonated oligomers or mixture of phosphonated oligomers of maleic acid, of the formula $H[CH(COOM)CH(COOM)]_n\text{---}PO_3M_2$, where n is 1 or an integer greater than 1, and M is a cationic species (e.g., alkali metal cations) such that the compound is water soluble. Exemplary phosphonocarboxylates include phosphonosuccinic acid, 1-phosphono-1,2,3,4-tetracarboxybutane, and 1-phosphono-1,2,3,4,5,6-hexacarboxyhexane. The phosphonocarboxylates can be a mixture of compounds having the preceding formula with differing values for "n". The mean value of "n" can be 1 to 2, or, more specifically, 1.3 to 1.5. The synthesis of the phosphonocarboxylates is known and described in U.S. Pat. No. 5,606,105. The phosphonocarboxylates are separate and different from the carboxylic acids described above. The carboxylic acid described above consists of carbon, hydrogen and oxygen and are free of non-oxygen heteroatoms.

Phosphinocarboxylates are compounds having the general formula

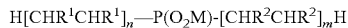

$$H[CHR^1CHR^1]_n-P(O_2M)-[CHR^2CHR^2]_mH$$

wherein at least one $R^1$ group in each unit is a COOM, $CH_2OH$, sulphono or phosphono group and the other $R^1$ group which may be the same as, or different from, the first $R^1$ group, is a hydrogen or a COOM, hydroxyl, phosphono, sulphono, sulphato, $C_{1-7}$ alkyl, $C_{1-7}$ alkenyl group or a carboxylate, phosphono, sulphono, sulphato and/or hydroxyl substituted $C_{1-7}$ alkyl or $C_{1-7}$ alkenyl group, n is an integer equal to or greater than 1, and each M is hydrogen or an alkali metal ion such as a sodium ion, potassium ion and the like. Similarly, at least one $R^2$ group in each unit is a COOM, $CH_2OH$, sulphono or phosphono group and the other $R^2$ group which may be the same as, or different from, the first $R^2$ group, is a hydrogen or a COOM, hydroxyl, phosphono, sulphono, sulphato, $C_{1-7}$ alkyl, $C_{1-7}$ alkenyl group or a carboxylate, phosphono, sulphono, sulphato and/or hydroxyl substituted $C_{1-7}$ alkyl or $C_{1-7}$ alkenyl group, m is an integer equal to or greater than 0. Furthermore, at least one COOM group will be present in one of the $R^1$ and $R^2$ groups. Exemplary phosphinocarboxylates include phosphinicosuccinic acid and water soluble salts, phosphinicobis (succinic acid) and water soluble salts and phosphinicosuccinic acid oligomer and salts as described in U.S. Pat. Nos. 6,572,789 and 5,018,577. The phosphonocarboxylates can be a mixture of compounds having the preceding formula with differing values for "n" and "m". The phosphinocarboxylates are separate and different from the carboxylic acids described above.

Exemplary surfactants include fatty acid esters, such as sorbitan fatty acid esters, polyalkylene glycols, polyalkylene glycol esters, copolymers of ethylene oxide (EO) and propylene oxide (PO), polyoxyalkylene derivatives of a sorbitan fatty acid ester, and mixtures thereof. The average molecular weight of the non-ionic surfactants can be about 55 to about 300,000, or, more specifically about 110 to about 10,000. Suitable sorbitan fatty acid esters include sorbitan monolaurate (e.g., sold under trade name Span® 20, Arlacel® 20, S-MAZ® 20M1), sorbitan monopalmitate (e.g., Span® 40 or Arlacel® 40), sorbitan monostearate (e.g., Span® 60, Arlacel® 60, or S-MAZ® 60K), sorbitan monooleate (e.g., Span® 80 or Arlacel® 80), sorbitan monosesquioleate (e.g., Span® 83 or Arlacel® 83), sorbitan trioleate (e.g., Span® 85 or Arlacel® 85), sorbitan tridtearate (e.g., S-MAZ® 65K), sorbitan monotallate (e.g., S-MAZ® 90). Suitable polyalkylene glycols include polyethylene glycols, polypropylene glycols, and mixtures thereof. Examples of polyethylene glycols suitable for use include CARBOWAX™ polyethylene glycols and methoxypolyethylene glycols from Dow Chemical Company, (e.g., CARBOWAX PEG 200, 300, 400, 600, 900, 1000, 1450, 3350, 4000 & 8000, etc.) or PLURACOL® polyethylene glycols from BASF Corp. (e.g., Pluracol® E 200, 300, 400, 600, 1000, 2000, 3350, 4000, 6000 and 8000, etc.). Suitable polyalkylene glycol esters include mono- and di-esters of various fatty acids, such as MAPEG® polyethylene glycol esters from BASF (e.g., MAPEG® 200ML or PEG 200 Monolaurate, MAPEG® 400 DO or PEG 400 Dioleate, MAPEG® 400 MO or PEG 400 Monooleate, and MAPEG® 600 DO or PEG 600 Dioleate, etc.). Suitable copolymers of ethylene oxide (EO) and propylene oxide (PO) include various Pluronic and Pluronic R block copolymer surfactants from BASF, DOWFAX non-ionic surfactants, UCON™ fluids and SYNALOX lubricants from DOW Chemical. Suitable polyoxyalkylene derivatives of a sorbitan fatty acid ester include polyoxyethylene 20 sorbitan monolaurate (e.g., products sold under trademarks TWEEN 20 or T-MAZ 20), polyoxyethylene 4 sorbitan monolaurate (e.g., TWEEN 21), polyoxyethylene 20 sorbitan monopalmitate (e.g., TWEEN 40), polyoxyethylene 20 sorbitant monostearate (e.g., TWEEN 60 or T-MAZ 60K), polyoxyethylene 20 sorbitan monooleate (e.g., TWEEN 80 or T-MAZ 80), polyoxyethylene 20 tristearate (e.g., TWEEN 65 or T-MAZ 65K), polyoxyethylene 5 sorbitan monooleate (e.g., TWEEN 81 or T-MAZ 81), polyoxyethylene 20 sorbitan trioleate (e.g., TWEEN 85 or T-MAZ 85K) and the like.

Exemplary antifoam agents include polydimethylsiloxane emulsion based antifoams. They include PC-5450NF from Performance Chemicals, LLC in Boscawen, N.H.; CNC antifoam XD-55 NF and XD-56 from CNC International in Woonsocket in R.I. Other antifoams suitable for use in the instant invention include copolymers of ethylene oxide (EO) and propylene oxide (PO), such as Pluronic L-61 from BASF.

Generally, the optional antifoam agents may comprise a silicone, for example, SAG 10 or similar products available from OSI Specialties, Dow Corning or other suppliers; an ethylene oxide-propylene oxide (EO-PO) block copolymer and a propylene oxide-ethylene oxide-propylene oxide (PO-EP-PO) block copolymer (e.g., Pluronic L61, Pluronic L81, or other Pluronic and Pluronic C products); poly(ethylene oxide) or poly(propylene oxide), e.g., PPG 2000 (i.e., polypropylene oxide with an average molecular weight of 2000); a hydrophobic amorphous silica; a polydiorganosiloxane based product (e.g., products containing polydimethylsiloxane (PDMS), and the like); a fatty acid or fatty acid ester (e.g., stearic acid, and the like); a fatty alcohol, an alkoxylated alcohol and a polyglycol; a polyether polyol acetate, a polyether ethoxylated sorbital hexaoleate, and a poly (ethylene oxide-propylene oxide) monoallyl ether acetate; a wax, a naphtha, kerosene and an aromatic oil; and combinations comprising one or more of the foregoing antifoam agents.

The heat transfer fluid additive composition can be used in several ways. It may be combined with water, a non-aqueous solvent, or combination of water and a non-aqueous solvent to form a heat transfer fluid. It may be added to an existing heat transfer fluid to modify the composition of the heat transfer fluid. It may be added to a heat transfer system comprising a heat transfer fluid to modify the heat transfer fluid.

A method of making a heat transfer fluid comprises combining a heat transfer additive composition with water, a non-aqueous solvent, or a combination of water and a non-aqueous solvent wherein the heat transfer additive composition comprises greater than or equal to 10 weight percent (wt %) of a carboxylate, based on the total weight of the composition; an azole compound; a base; and water, wherein the base is present in an amount sufficient to obtain a pH of 7 to 10.5 when the heat transfer additive composition is diluted by 50 volume % with water. Non-aqueous solvents useful in making the heat transfer fluid include those described above in relation to the heat transfer fluid additive composition as well as in alcohol having one to 4 carbon atoms (e.g., methanol, ethanol, propanol, butanol) and combinations comprising two or more of the non-aqueous solvents described herein.

The heat transfer additive composition can be combined with water and/or non-aqueous solvent in a volume ratio in the range of 1 to 5 to 1 to 40. Within this range, the volume ratio can be less than or equal to 1 to 9, or, less than or equal to 1 to 5. Also within this range, the volume ratio can be greater than or equal to 1 to 18, or, greater than or equal to 1 to 36.

A method of making a modified heat transfer fluid comprises combining a heat transfer additive composition with an existing heat transfer fluid to form a modified heat transfer fluid wherein heat transfer fluid additive comprises greater than or equal to 10 weight percent (wt %) of a carboxylate, based on the total weight of the composition; an azole compound; a base; and water, wherein the base is present in an amount sufficient to obtain a pH of 7 to 10.5 when the heat transfer additive composition is diluted by 50 volume % with water. The existing heat transfer fluid may be new (used outside a heat transfer system) or the existing heat transfer fluid may be used (already in contact with a heat transfer system).

The heat transfer additive composition can be combined with the existing heat transfer fluid in a volume ratio in the range of 1 to 10 to 1 to 50. Within this range, the volume ratio can be greater than or equal to 1 to 35, or, greater than or equal to 1 to 25. Also within this range, the volume ratio can be less than or equal to 1 to 10, or, less than or equal to 1 to 20.

It is also contemplated that in some applications, such as heavy duty engines, it may be desirable to incorporate one or more additional corrosion inhibitors such as nitrites, molybdates, and salts thereof.

The heat transfer additive composition is further demonstrated by the following non-limiting examples.

EXAMPLES

The heat transfer additive compositions shown in Table 1 were made by combining the listed ingredients. The amounts shown in the table are in weight percent based on the total weight of the additive composition. PM-5150 is an antifoam commercially available from Prestone Products Corporation. Chromatint Orange 1735 is a colorant commercially available from Chromatech Incorporated. Dye X-0714 is a colorant commercially available from Chromatech Incorporated. Uranine dye is commercially available from Chromatech Incorporated.

TABLE 1

|  | Concentrate A | Concentrate B | Concentrate C | Concentrate D | Concentrate E |
| --- | --- | --- | --- | --- | --- |
| Ethylene Glycol | 37.1720 | 36.9670 | 34.9983 | 30.5685 | 26.5582 |
| Sodium Tolyltriazole | 2.3600 | 2.3600 | 2.3599 | 2.6067 | 2.7654 |
| Sodium Hydroxide | 9.8690 | 9.8690 | 9.8695 | 10.9830 | 11.6631 |
| Neo Decanoic Acid | 9.5900 | 9.5900 | 9.5895 | 10.5704 | 11.1373 |
| 2-Ethyl Hexanoic acid | 28.7700 | 28.7700 | 28.7786 | 31.6737 | 33.4404 |
| Deionized water | 12.2290 | 12.2290 | 12.2294 | 13.5896 | 14.4285 |
| PM-5150 antifoam |  |  | 1.9999 |  |  |
| Chromatint Orange 1735 |  | 0.2150 |  |  |  |
| Dye X-0714 |  |  | 0.1750 |  |  |
| Uranine Dye, 40% | 0.0100 |  |  | 0.0082 | 0.0071 |
| Total, % | 100.0000 | 100.0000 | 100.0000 | 100.0000 | 100.0000 |
| pH @ 50% dilution with water | 9.5 | 9.5 | — | 10.01 | 10.34 |

Concentrate B was diluted with differing types of diluents and in differing amounts to form Test Solutions as shown in Table 2. The composition of the test water referred to in Table 2 is shown in Table 3. The Test Solutions were tested according to ASTM D4340 and D1384. Amounts in Table 2 are in parts by weight. The amounts in Table 3 are in weight percent.

TABLE 2

|  | Test Solution A | Test Solution B | Test Solution C | Test Solution E |
| --- | --- | --- | --- | --- |
| Concentrate B | 175 | 175 | 175 | 175 |
| Ethylene glycol | 1370 |  | 685 |  |
| Test Water | 2055 | 2055 | 1713 | 1370 |
| Commercial Coolant Concentrate |  | 1370 | 1027 | 2055 |
| Test Results from ASTM D4340 |  |  |  |  |
| mg/cm²/wk, water cleaned, 25 v % coolant | −0.05 | −0.05 | 0.01 | 0.03 |
| mg/cm²/wk, acid cleaned, 25 v % coolant | −0.04 | −0.01 | 0.06 | 0.10 |
| Test Results from ASTM D1384 coupon weight loss in milligrams, average of triplicate tests |  |  |  |  |
| Copper, UNS C11000 | 1.2 | 1.4 | 1.0 | 2.3 |
| ASTM Solder, SAE 3A | 0.0 | −0.3 | −0.4 | 0.6 |
| Brass, UNS C26000 | −1.5 | 0.0 | −0.2 | 0.6 |
| Carbon Steel, UNS G10200 | −0.7 | −0.7 | −0.3 | −0.2 |

TABLE 2-continued

|  | Test Solution A | Test Solution B | Test Solution C | Test Solution E |
|---|---|---|---|---|
| Cast Iron, UNS F10007 | −2.3 | −1.4 | −1.0 | −1.0 |
| Cast Aluminum, UNS A23190 | 4.0 | 3.1 | 1.1 | −1.1 |

The commercial coolant concentrate was an Extended Life OAT type coolant concentrate. "Water cleaned" refers to taking the test sample at the end of test and first water cleaning it and determining the corrosion rate. "Acid cleaned" refers to taking the same test sample and doing an acid cleaning per ASTM D4340. These two set of numbers then can be compared to provide additional information. A comparison of these numbers shows if there is a deposit on the sample surface (water cleaning will not remove it but acid cleaning will).

TABLE 3

|  | wt % |
|---|---|
| Deionized water | 99.8909 |
| Sodium Sulfate, $Na_2SO_4$ | 0.0148 |
| Sodium Chloride, NaCl | 0.0165 |
| Sodium Formate, HCOONa | 0.0138 |
| Ferric Nitrate, $Fe(NO_3)_3$ | 0.0217 |
| Aluminum Nitrate, $Al(NO_3)_3$ | 0.0224 |
| Calcium Carbonate, $CaCO_3$ | 0.0200 |

Concentrate B was also diluted with varying amounts of water and tested according to ASTM D4340 for the corrosion rate. Each solution also comprises 100 ppm of NaCl. These dilutions were tested according to ASTM D4340.

TABLE 4

| wt % Concentrate B in DI water and 100 ppm NaCl | Corrosion Rate | |
|---|---|---|
|  | Water Washed, mg/cm²/wk | Acid Washed, mg/cm²/wk |
| 2.5 | 0.05 | 0.22 |
| 10.0 | −0.11 | −0.16 |
| 20.0 | −0.12 | −0.14 |
| 50.0 | 0.12 | 0.16 |
| 60.0 | −0.02 | 0.03 |

Finally, varying concentrations of Concentrate B in deionized water were tested for the freezing point. This data is represented both in Fahrenheit and Centigrade. Results are shown in Table 5. The pH of the solutions was also tested.

TABLE 5

| wt % Concentrate B | wt % DI Water | Freeze Point, ° F. | Freeze Point, ° C. | pH |
|---|---|---|---|---|
| 70 | 30 | −22.9 | −30.5 | — |
| 60 | 40 | −8.1 | −22.3 | — |
| 50 | 50 | 2.3 | −16.5 | 9.6 |
| 25 | 75 | 18.6 | −7.4 | 9.2 |
| 10 | 90 | 27.9 | −2.3 | 8.7 |
| 5 | 95 | 30.2 | −1 | 8.6 |

The singular forms "a," "an," and "the" include plural referents unless the context clearly dictates otherwise. The endpoints of all ranges reciting the same characteristic or component are independently combinable and inclusive of the recited endpoint. All references are incorporated herein by reference. The terms "first," "second," and the like herein do not denote any order, quantity, or importance, but rather are used to distinguish one element from another. The various embodiments and ranges described herein are combinable to the extent that the description is not contradictory.

While typical embodiments have been set forth for the purpose of illustration, the foregoing descriptions should not be deemed to be a limitation on the scope herein. Accordingly, various modifications, adaptations, and alternatives may occur to one skilled in the art without departing from the spirit and scope herein.

The invention claimed is:

1. A heat transfer fluid additive composition comprising:
   a salt of a carboxylic acid containing 6 to 20 carbon atoms, wherein the salt of the carboxylic acid is present in a range from about 20 weight percent to about 80 weight percent based on a total weight of the heat transfer fluid additive composition;
   an azole compound;
   a base; and
   water in an amount from about 10 weight percent to about 40 weight percent;
   wherein the heat transfer fluid additive composition is free of other solvents and free of inorganic phosphate.

2. The heat transfer fluid additive composition of claim 1 further comprising an antifoam agent, a colorant, a scale inhibitor, a surfactant, a molybdate or a salt thereof, a nitrite or a salt thereof, or a combination thereof.

3. The heat transfer fluid additive composition of claim 1 wherein the composition is free of silicate.

4. The heat transfer fluid additive composition of claim 1, wherein the carboxylic acid is an aromatic carboxylic acid.

5. The heat transfer fluid additive composition of claim 1, wherein the carboxylic acid is an aliphatic carboxylic acid.

6. The heat transfer fluid additive composition of claim 1, further comprising a molybdate.

7. The heat transfer fluid additive composition of claim 6, wherein the molybdate is calcium molybdate, lithium molybdate, magnesium molybdate, or a combination thereof.

8. The heat transfer fluid additive composition of claim 1, wherein the azole compound is present in an amount of about 0.01 wt. % to about 10 wt. % of the composition.

9. The heat transfer fluid additive composition of claim 1, wherein the azole compound is present in an amount of about 0.3 wt. % to about 9 wt. % of the composition.

10. The heat transfer fluid additive composition of claim 1, wherein the azole compound is present in an amount of about 0.5 wt. % to about 8 wt. % of the composition.

11. The heat transfer fluid additive composition of claim 1, wherein the base is present in an amount sufficient to obtain a pH of about 7.5 to about 10.5 when the heat transfer additive composition is diluted by 50 vol. % with water.

12. The heat transfer fluid additive composition of claim 1, wherein the base is present in an amount sufficient to obtain a pH of about 8 to about 10.5 when the heat transfer additive composition is diluted by 50 vol. % with water.

13. The heat transfer fluid additive composition of claim 1, wherein the water is present in an amount of about 10 wt. % to about 25 wt. % of the composition.

14. The heat transfer fluid additive composition of claim 1, wherein the base is sodium hydroxide.

15. The heat transfer fluid additive composition of claim 1, wherein the azole compound is sodium tolyltriazole, benzotriazole, or a combination thereof.

16. The heat transfer fluid additive composition of claim 1, wherein the azole compound is selected from the group consisting of benzotriazole, tolyltriazole, methyl benzotriazole, butyl benzotriazole, mercaptobenzothiazole, thiazole, substituted thiazoles, imidazole, benzimidazole, substituted imidazoles, indazole, substituted indazoles, tetrazole, tetrahydrotolyltriazole, substituted tetrazoles, and a combination thereof.

17. The heat transfer fluid additive composition of claim 1, wherein the azole compound comprises a benzotriazole, wherein an alkyl group of the benzotriazole contains 2 to 20 carbon atoms.

18. The heat transfer fluid additive composition of claim 1, wherein the carboxylic acid is neodecanoic acid, 2-ethyl hexanoic acid, or a combination thereof.

19. The heat transfer fluid additive composition of claim 1, wherein the base is present in an amount of about 9 wt. % to about 12 wt. % of the composition.

20. A method of making a heat transfer fluid comprising combining the heat transfer fluid additive composition of claim 1 with water, a non-aqueous solvent, or a combination thereof.

21. The method of claim 20, wherein the heat transfer fluid additive composition is free of silicate, borate, and amines and has a nitrate content of less than 100 ppm.

22. The method of claim 20, wherein the azole compound is present in an amount of about 0.01 wt. % to about 10 wt. % of the composition.

23. The method of claim 20, wherein the azole compound is present in an amount of about 0.5 wt. % to about 8 wt. % of the composition.

24. The method of claim 20, wherein the base is present in an amount sufficient to obtain a pH of about 7.5 to about 10.5 when the heat transfer additive composition is diluted by 50 vol. % with water.

25. The method of claim 20, wherein the base is present in an amount sufficient to obtain a pH of about 8 to about 10.5 when the heat transfer additive composition is diluted by 50 vol. % with water.

26. The method of claim 20, wherein the water is present in an amount of about 10 wt. % to about 25 wt. % of the composition.

27. The method of claim 20, wherein the carboxylic acid is an aromatic carboxylic acid.

28. The method of claim 20, wherein the carboxylic acid is an aliphatic carboxylic acid.

29. The method of claim 20, wherein the heat transfer fluid additive composition further comprises a molybdate.

30. The method of claim 29, wherein the molybdate is calcium molybdate, lithium molybdate, magnesium molybdate, or a combination thereof.

31. The method of claim 20, wherein the base is sodium hydroxide.

32. The method of claim 20, wherein the non-aqueous solvent is a glycol.

33. The method of claim 32, wherein the glycol is ethylene glycol, propylene glycol, or a combination thereof.

34. The method of claim 20, wherein the azole compound is sodium tolyltriazole, benzotriazole, or a combination thereof.

35. The method of claim 20, wherein the carboxylic acid is neodecanoic acid, 2-ethyl hexanoic acid, or a combination thereof.

36. A method of making a modified heat transfer fluid comprising combining the heat transfer fluid additive composition of claim 1 with an existing heat transfer fluid to form a modified heat transfer fluid.

37. The method of claim 36, wherein the existing heat transfer fluid is not in contact with a heat transfer system.

38. The method of claim 37, wherein the existing heat transfer fluid is in contact with a heat transfer system.

* * * * *